US008888294B2

(12) United States Patent
Kjær et al.

(10) Patent No.: US 8,888,294 B2
(45) Date of Patent: Nov. 18, 2014

(54) COOLING MODULE FOR MULTIPLE LIGHT SOURCE PROJECTING DEVICE

(75) Inventors: Lars Kjær, Hovedgaard (DK); Dennis Jørgensen, Rønde (DK)

(73) Assignee: Martin Professional ApS, Aarhus N. (DK)

( * ) Notice: Subject to any disclaimer, the term of this patent is extended or adjusted under 35 U.S.C. 154(b) by 379 days.

(21) Appl. No.: 13/518,110

(22) PCT Filed: Dec. 21, 2010

(86) PCT No.: PCT/DK2010/050355

§ 371 (c)(1),
(2), (4) Date: Aug. 20, 2012

(87) PCT Pub. No.: WO2011/076219

PCT Pub. Date: Jun. 30, 2011

(65) Prior Publication Data

US 2012/0313980 A1 Dec. 13, 2012

(30) Foreign Application Priority Data

Dec. 21, 2009 (DK) ................................ 2009 01359
Mar. 23, 2010 (DK) ................................ 2010 00240

(51) Int. Cl.

| | |
|---|---|
| ***G03B 21/00*** | (2006.01) |
| ***F21S 10/00*** | (2006.01) |
| ***F21V 29/02*** | (2006.01) |
| ***F21V 29/00*** | (2006.01) |
| *F21W 131/406* | (2006.01) |
| *F21Y 101/02* | (2006.01) |

(52) U.S. Cl.

CPC ............... *F21S 10/007* (2013.01); *F21V 29/02* (2013.01); *F21V 29/2225* (2013.01); *F21V 29/027* (2013.01); *F21W 2131/406* (2013.01); *F21Y 2101/02* (2013.01)

USPC .................. 353/31; 353/94; 353/97; 353/98; 353/100; 361/697; 361/704

(58) Field of Classification Search

USPC ..................... 353/30, 31, 37, 94, 97, 98, 100; 362/227, 294, 345, 362, 373; 165/80.3, 165/121, 104.33; 361/687, 695, 697–701, 361/704–711

See application file for complete search history.

(56) References Cited

U.S. PATENT DOCUMENTS 6,269,864 B1 8/2001 Kabadi
6,357,893 B1 3/2002 Belliveau (Continued)

FOREIGN PATENT DOCUMENTS

CN 1423838 6/2003
CN 101173841 5/2008

(Continued)

OTHER PUBLICATIONS

Third Office Action dated Aug. 15, 2014 issued in corresponding Chinese Application No. 2010800596857; 6 pages.

(Continued)

*Primary Examiner* — Sultan Chowdhury
(74) *Attorney, Agent, or Firm* — Blank Rome LLP

(57) ABSTRACT

An illumination device having a number of light sources and a number of light collectors. The light collectors collect light generated by the light sources and convert the light into a source light beam propagating primarily along a primary optical axis. The light sources and the light collectors can be part of a light source module. The light source module can include a cooling module comprising a number of interconnected plane mounting surfaces angled in relation to each other, with the light sources arranged on said plane mounting surfaces. The cooling module can include a first side comprising the mounting surfaces and a second side comprising a number of cooling fins defining a number of radial air channels.

15 Claims, 7 Drawing Sheets

(56) References Cited

U.S. PATENT DOCUMENTS

| | | | | |
|---|---|---|---|---|
| 8,733,949 | B2 * | 5/2014 | Chong et al. | 353/94 |
| 2002/0181231 | A1 | 12/2002 | Luk | |
| 2008/0105416 | A1 | 5/2008 | Katoh et al. | |
| 2008/0304536 | A1 | 12/2008 | Gold et al. | |
| 2009/0103296 | A1 | 4/2009 | Harbers et al. | |
| 2010/0170657 | A1 * | 7/2010 | Kaslusky | 165/80.3 |
| 2011/0013383 | A1 * | 1/2011 | Medinis | 362/105 |

FOREIGN PATENT DOCUMENTS

| | | |
|---|---|---|
| CN | 201137901 | 10/2008 |
| CN | 101377290 | 3/2009 |
| CN | 101487573 | 7/2009 |
| CN | 201297601 | 8/2009 |
| CN | 101598268 | 12/2009 |
| EP | 2177816 | 4/2010 |
| WO | WO2008/086665 | 7/2008 |

OTHER PUBLICATIONS

China Search Report (2nd) dated Aug. 6, 2014 issued in corresponding Chinese Application No. 2010800596857; 2 pages.

English translation of Search Report dated Aug. 6, 2014; 1 page.

English abstract; Chinese Publication No. CN1423838; 1 page.

English abstract: Chinese Publication No. CN101173841; 1 page.

Supplementary European Search Report; European Application No. 10838719.2; dated Jun. 18, 2013; 8 pages.

English abstract; Chinese Application No. 101598268; 1 page.

English abstract; Chinese Application No. 201297601; 1 page.

English abstract; Chinese Application No. 101377290; 1 page.

First Office Action; Dated: Aug. 7, 2013; Chinese Application No. 201080059685.7; 6 pages.

English translation of First Office Action; Chinese Application No. 201080059685.7; 5 pages.

Search Report; Dated: Jul. 29, 2013; Chinese Application No. 201080059685.7; 2 pages.

English translation of Search Report; Chinese Application No. 201080059685.7; 1 page.

English abstract; Chinese Application No. CN101487573; 1 page.

International Search Report; International Application No. PCT/DK2010/050355; Internationa Filing Date: Dec. 21, 2010; 3 pages.

Chinese Translation of Claims for Chinese Application No. CN201137901; 1 page.

* cited by examiner

COOLING MODULE FOR MULTIPLE LIGHT SOURCE PROJECTING DEVICE

FIELD OF THE INVENTION

The present invention relates to an illumination device for illuminating an optical gate of a projecting illumination device projecting an image of the optical gate towards a target surface. The illumination device comprises a light source module generating light, an aperture delimiting the optical gate and a projecting system adapted to project the optical gate at a target surface.

BACKGROUND OF THE INVENTION

Light emitting diodes (LED) are, due to their relatively low energy consumption, long lifetime, and capability of electronic dimming, becoming more and more used in connection with lighting applications. LEDs are successfully used in lighting applications for general illumination such as, wash/flood lights illuminating a wide area or for generating wide light beams e.g. for the entertainment industry.

However, LEDs have not presently been successfully used in connection with light application systems where an image is created and projected towards a target surface. This is especially the case in connection with entertainment lightning, where a high demand for lumen output and high image quality are required. LED projecting systems have not yet been able to fulfill these requirements.

The light in projecting systems is generally collected into an optical gate where the image is generated, and an imaging optical system projects the gate onto a target surface. WO0198706, U.S. Pat. No. 6,227,669 and U.S. Pat. No. 6,402,347 disclose lighting systems comprising a number of LEDs arranged in a plane array where a converging lens is positioned in front of the LEDs in order to focus the light, for instance to illuminate a predetermined area/gate or for coupling the light from the diodes into an optical fiber.

Lighting systems where the light from a number of LEDs are directed towards a common focal point or focusing area are also known. U.S. Pat. No. 6,443,594, U.S. Pat. No. 7,226,185B, EP1710493 use individually refracting means positioned in front of each LED to direct the light form each LED towards a common focal point. JP2006269182 A2, WO0198706, U.S. Pat. No. 5,309,277 tilt the LEDs in relation to the optical axis in order to direct the light form each LED towards a common focal point The prior art fixtures try to increase the lumen output by adding as many light sources as possible. The consequence is, however, that the efficiency with regard to power consumption versus light output is very low. Furthermore, a large amount of light is lost as the prior art fixtures typically only couple a central part of the light of the light beams through the gate in order to provide a uniform illumination of the gate, which again reduces the efficiency.

Another aspect is the fact the LED generates much heat which can reduce lifetime, efficiency, light output of the LEDs and also cause change in the color of the emitted light. The LED therefore need to be cooled and also kept a constant temperature. The heat increases with the amount of LED and the cooling needs are further increased as more and more LEDs are used. The system where the LED array is mounted in a plane pattern solves the cooling aspect by mounting the LEDs on a planer heat sink. The complexity of the cooling issue is however complicated further in optical systems where the LED are angled in relation to each other.

JP2006269182 discloses a system including LED holding portions on which the LEDs are mounted in such manner that their optical axes are directed to apertures of an aperture portion. The holding portions are embodied as pedestals/turrets and the heat must dissipate through these before it can be led away by a heat sink.

US2008290357 discloses a LED package including a carrier, a pair of conductive wire units, an LED chip, and a control circuit module is provided. The carrier has a carrying portion and a ring frame connected to the periphery of the carrying portion. The carrying portion has a dome-like upper surface and a pair of through holes. The pair of conductive wire units is disposed inside the through holes respectively, and each of the conductive wire units has a conductive wire and an insulating material encapsulating the conductive wire. The LED chip is disposed on the upper surface of the carrier and is electrically connected to the conductive wires. The control circuit module is disposed at a bottom of the carrier and is electrically connected to the conductive wires for controlling the operation of the LED chip.

CN 101832 discloses a light projector where each LED is mounted at the end of a cylinder having radials protruding pins. The cylinders are arranged such the LEDs are arranged in a concave pattern.

US2002/0181231 discloses a lighting system for stage, theatrical and architectural lighting, comprising a frame for supporting a plurality of light emitting diodes. The diodes are mounted to the frame so that each diode is both secured to the frame and also simultaneously positioned wherein each discrete diode light beam is directed to a prescribed remote focal point (target zone) and thereupon directed to a predetermined illumination area. Electrical power for transmitting and controlling electrical voltage to light emitting diodes by electrical circuitry integral with the frame. The frame can be configured as any hollow volume such a cone, a semi-ellipse, and a semi-sphere or can be configured as planar. Flexible blanks having apertures and pads for electrical connections can be used to construct rigid frames. An imaging gate a collimating lens and a focusing lens can be interposed between the frame and the illumination area. The frame can also be a sandwich frame having positive and negative electrically conductive layers interposed between layers of biasable insulating foam.

These systems are complex and expensive to manufacture and the cooling demands are not enough for cooling high power LEDs. The space in a light fixtures is often limited and it is difficult to fit many light sources into prior art fixtures, for instance because the optical components associated with the light sources often take up a lot of space.

DESCRIPTION OF THE INVENTION

The objective of the present invention is to solve or minimize at least some of the above described problems. This can be achieved by the invention as defined by the independent claims. The benefits and advantages of the present invention are disclosed in the detailed description of the drawings illustrating the invention. The dependent claims define different embodiments of the invention.

DETAILED DESCRIPTION OF THE INVENTION

Figure 1:
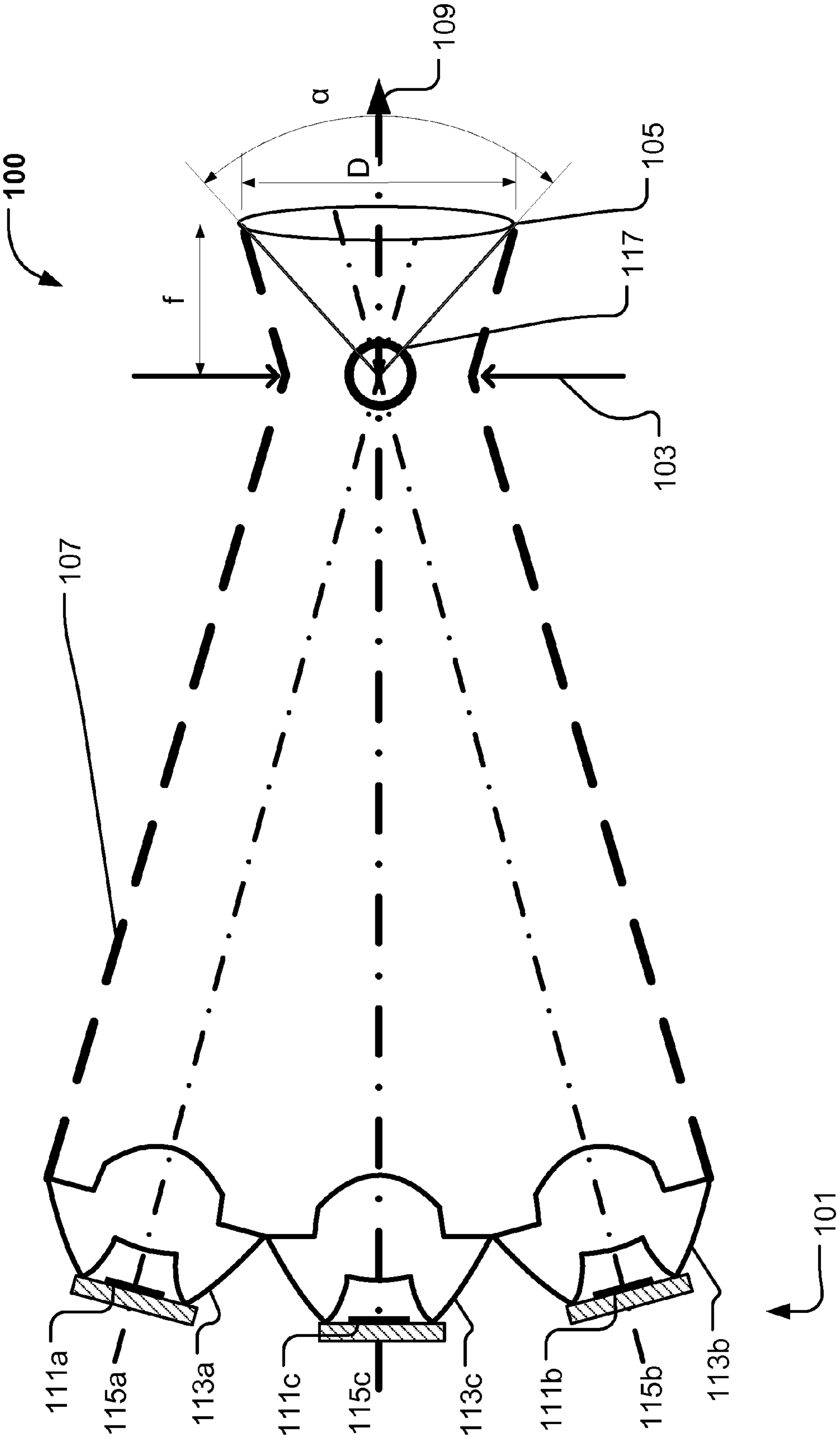
FIG. 1 illustrates a general optical setup of an illumination device wherein the present invention can be used.

Figure illustrates a general setup of the illumination device according to the present invention. The person skilled in the art of optics will realize that some of the shown light rays illustrate the principles behind the present invention rather than illustrating exact precise light rays.

The illumination device 100 comprises a light source module 101, an aperture 103 and a projecting system 105. The light source module generates a light beam (illustrated by thick dashed lines 107) propagating along a primary optical axis 109 towards the aperture 103. The aperture 103 is positioned upstream of the optical axis, with respect to the light source module. The projecting system 105 collects the light which has passed the aperture 103 and projects an image of a plane near the aperture 103 onto a target surface (not shown) a given distance from the projecting system. It is thus possible to arrange a light modifier such as an image generating object near the aperture 103, whereby the generated image will be projected to the target surface. An object plane is thus defined near the aperture and the aperture diameter is limiting the object diameter. The image generating object can for instance be a GOBO, coated texture glass, a LCD, DMD, LCOS, or any object capable of modifying the light beam. The area near the aperture may be defined as a position starting for a small distance in front of the aperture and ending at a small distance after the aperture, where the small distance in front and after of the aperture both do not exceed the cross section of the aperture.

The light source module comprises a number of light sources 111*a*-111*c* and a number of light collecting means 113*a*-113*c*. The light collecting means collect light from the light sources and generate a source light beam (not shown for simplicity) propagating along a source optical axis 115*a*-115*c*. Each source optical axis can be defined by a three-dimensional vector in relation to a primary optical axis 109 and the largest vector component of the vector defining each source optical axis is aligned with the primary optical axis. The source light beams can thus be angled in relation to the primary optical axis but will primarily propagate along the primary optical axis. The source optical axes meet in a common volume 117 along the primary optical axis. The common volume is a volume near the primary optical axis where at least one source optical axis intersects a plane comprising the primary optical axis, and where at least one source optical axis intersects a plane comprising at least another source axis. The source optical axes can in one embodiment intersect in a common focal point at the primary optical axis but do not, in other embodiments, necessarily intersect in a common focal point and can thus intersect in the common focal volume.

The projecting system 105 has an acceptance angle relative to the primary optical axis. The acceptance angle relative to the primary optical axis defines the maximum angle that a light beam can have in relation to the primary optical axis in order to be projected by the projecting system. Light beams having a larger angle relative to the primary axis will be lost in the optical system. The acceptance angle of a spherical symmetrical projecting system is given as:

$$\frac{\alpha}{2} = \arctan\left(\frac{D/2}{f}\right)$$

where α is the acceptance angle of the projecting system and f is the resulting focal length of the projecting system 105. D is the diameter of the entrance pupil of the projecting system, where the diameter of the entrance pupil is defined as the limiting diameter of the projecting system as seen from the object plane 103 through the front of the first lens. The limiting diameter of the projecting system is defined by the resulting acceptance area of the projecting system. The projecting system is illustrated as a single lens, but the person skilled in the art would understand that the projecting system can comprise any number of lenses and other optical elements, and even be a zoom system with variable focal length. The resulting focal length and resulting acceptance area of the projecting system is thus defined by the optical elements of the projecting system and the skilled person would be able to determine these based on her/his ordinary skills.

Figure 2A:
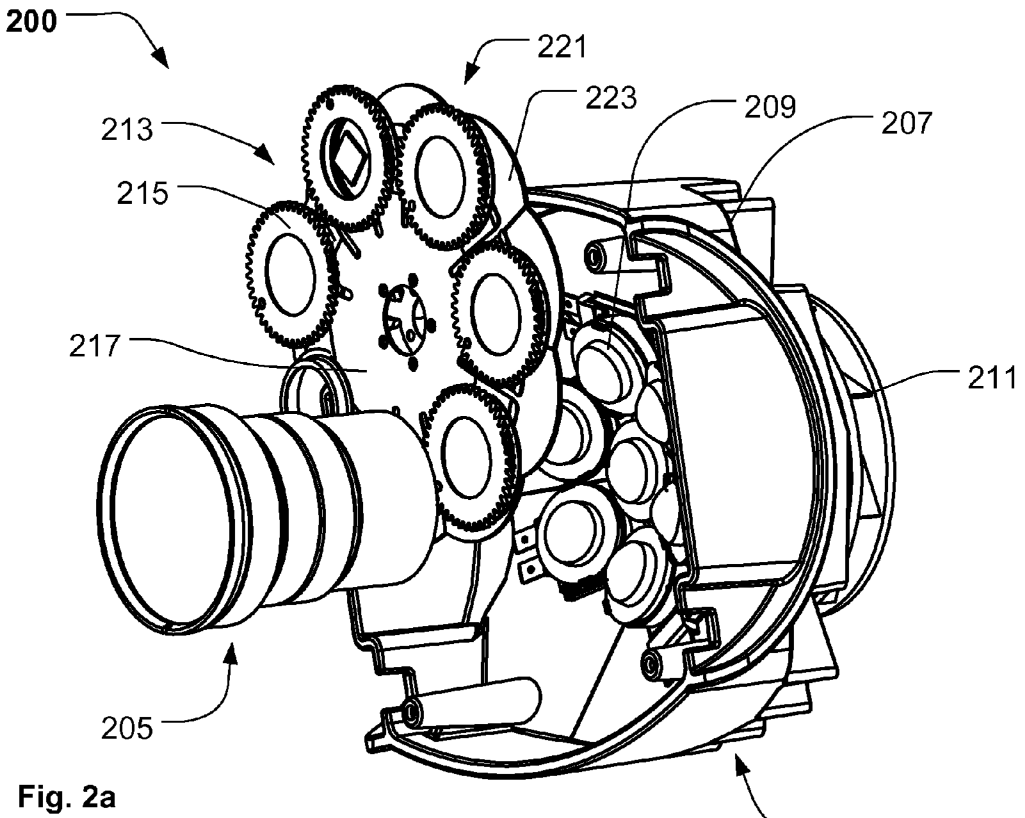
FIGS. 2*a* and 2*b* illustrate a GOBO projector including an illumination device according to the present invention.
Figure 2B:
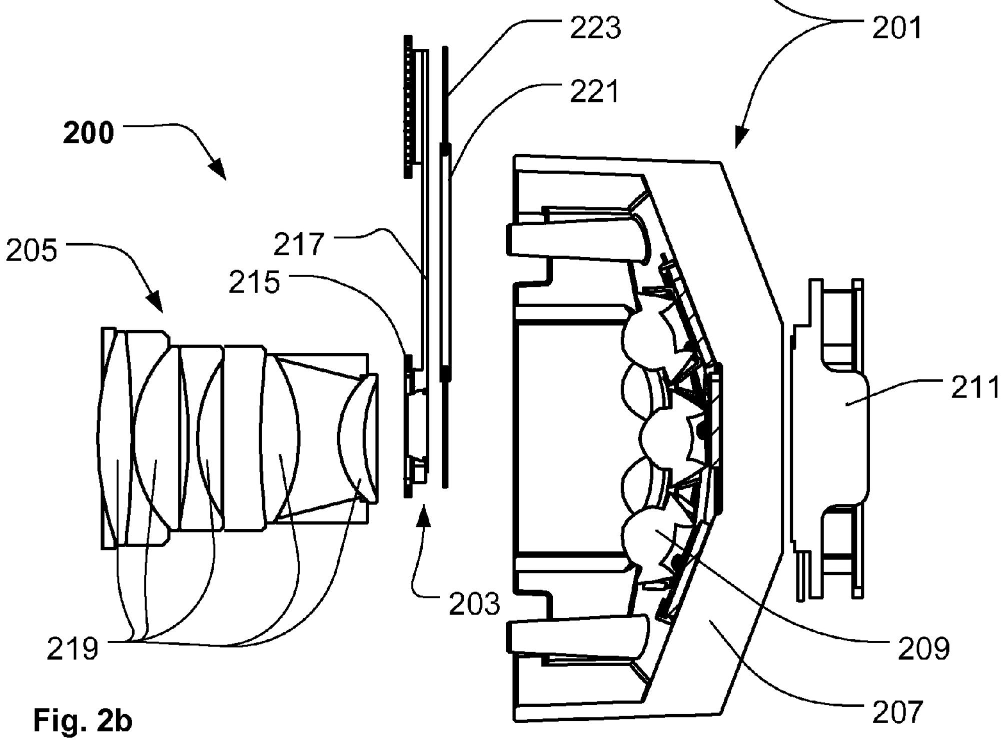

FIGS. 2*a* and 2*b* illustrate a possible embodiment of the illumination device according to the present invention, where FIG. 2*a* and FIG. 2*b*, respectively, illustrate a perspective view and a cross sectional view of the illumination device. The illumination device is here embodied as a gobo projector 200 adapted to image the gobo onto a target surface. The gobo projector comprises a light source module 201, aperture 203 and projecting system 205 arranged as described above.

The light source module comprises a number of LEDs mounted onto a cooling module 207 and below a number of TIR (Total Internal Reflection) lenses 209. The light source module further comprises blowing means 211 in the form of a fan adapted to force air towards a number of cooling fins on the backside of the cooling module. The TIR lenses act as light collecting means and collect and direct, as described above, the light from the LEDs towards the aperture and projecting system.

The gobo projector 200 comprises a gobo wheel 213 comprising a number of gobos 215 mounted on a rotating carousel 217 as known in the art of entertainment lighting. The gobo wheel can for instance be embodied as described in U.S. Pat. No. 5,402,326, U.S. Pat. No. 6,601,973, U.S. Pat. No. 6,687,063 or US2009/0122548 incorporated herein by reference. Each gobo can be moved into aperture 203 by rotating the carousel. The projecting system is adapted to create an image of the gobo at a target surface (not shown) and comprises a number of optical lenses 219.

The illustrated gobo projector further comprises a color wheel 221 comprising a number of optical filters 223 (e.g. dichroic filters, color gels or the like) which can also be positioned into the light beam. The color wheel is useful in the case that the light sources produce a white light beam and can be used to create a certain color of the light beam. The color wheel is, however, optional, as it can be omitted in the case where the light sources are of different colors and adapted to perform additive color mixing as known in the art of dynamic lighting. This is for instance possible by having a number of red, green and blue LEDs where the color mixing is based on the intensity of the different colors. The intensity of the different colors can for instance be controlled by the commonly known pulse width modulation (PWM) method, or by adjusting the DC current through each color LED.

Figure 3A:
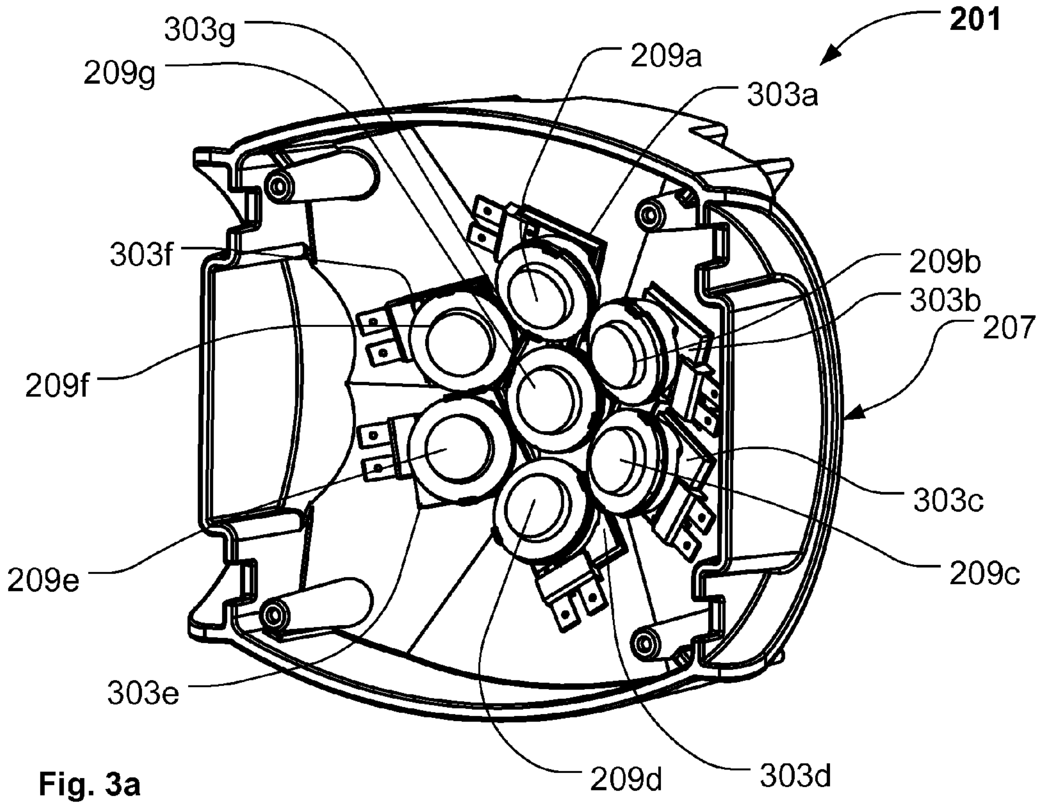
FIGS. 3*a* and 3*b* illustrate a cooling module of an illumination device according to the present invention.
Figure 3B:
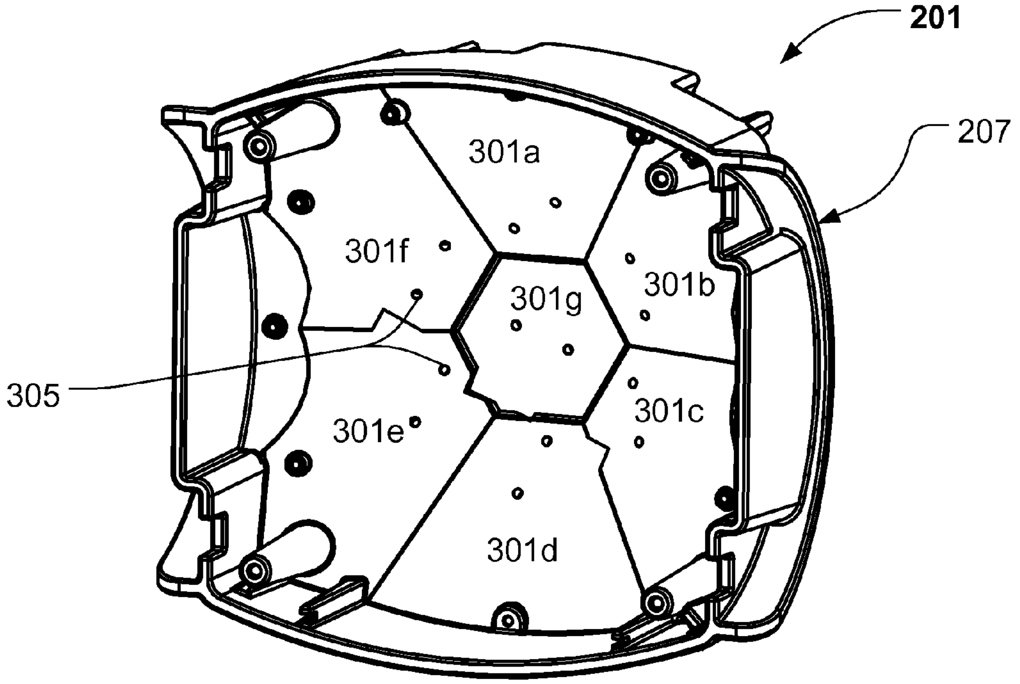

FIGS. 3*a* and 3*b* illustrate a perspective front view of the light source module 201 used in the gobo projector illustrated in FIGS. 2*a* and 2*b*. FIGS. 3*a* and 3*b* illustrate the light source module with LEDs and without LEDs, respectively. The light source module comprises a cooling module 207 having a first side comprising a number of interconnected plane mounting surfaces 301*a*-301*g* whereto a LED and its corresponding TIR lens (209*a*-209*g*) are mounted. Center mounting surface 301*g* is perpendicularly to the optical axis, and the LED and TIR lens 209*g* lens are positioned such that the primary optical axis goes through the LED and the TIR lens 209*g*. The peripheral mounting surfaces 301*a*-301*f* are angled relative to mounting surface 301*g*, and the light from the LEDs is directed towards the aperture. The angle of the peripheral mounting surfaces is determined such that the light emitted by the LEDs will hit the projecting system within the acceptance angle and cross section of the projecting system as described above. The plane mounting surfaces make it possible to mount the LEDs on plane circuit boards secured to the plane mounting surfaces. The result is that the heat generated by the LED can be dissipated from the circuit board through the plane mounting surfaces very easily as it is possible, in contrast to curved mounting surfaces, to provide tight contact over a large contact surface between the circuit board and the plane mounting surface. The different mounting surfaces are further interconnected resulting in the fact that heat from neighboring LEDs can be dissipated at least partially away through the neighboring mounting surface. This is useful in the case where different color LEDs are used and where some LEDs might periodically be turned off. LEDs which are turned on can in this case use the mounting surface and heat sink area related to turned off LEDs whereby more heat can be dissipated. The second side, which is opposite the first side, of the cooling module comprises a number of cooling fins improving the cooling effect of the LED. The cooling fins are provided just behind the mounting surfaces and the can thus be dissipated efficiently compared to the solution where the LED are mounted on a number of pedestals/turrets. The LEDs are arranged on separate plane metal core electric circuit boards 303*a*-303*g* which are arrange on different plane mounting surfaces 301-301*g*. The plane metal core electric circuits has very good terminal contact with the plane mounting surface due to plane surface structure and heat is as a consequence dissipated away very effectively. The terminal connection is even maintained in case that the components deform due to the generate heat. The mounting surface comprises a number of threaded holes 303 whereto the metal core electric circuit can be connected using a screw resulting in a tight thermal connecting between the LED circuit board and the mounting surfaces. However the skilled person realizes other kind of fastening means can be used for instance adhesive or nails.

The plane mounting surface is perpendicular to the light source beam generated by the light source mounted on the plane mounting surface. This simplifies the manufacturing process as the mounting surface also acts as an alignment mechanism ensuring that the light sources are mounted at correct angles in relation the primary optical axes.

The GOBO projector is in FIGS. 2 and 3 illustrated as a white light projector where at least one color wheel is used to create a colored light beam through subtractive color mixing. The projector can however also be embodied as an additive multicolored projector where different colored light from different light sources are combined and where the color of the light beam is changed based on additive color mixing. Additive color mixing is known in the art of dynamic lighting and can instance be embodied as a number of red, green and blue LEDs where the color mixing is based on the intensity of the different colors. The intensity of the different colors can for instance be controlled by the commonly known pulse width modulation (PWM) method, or by adjusting the DC current through each color LED.

Figure 4:
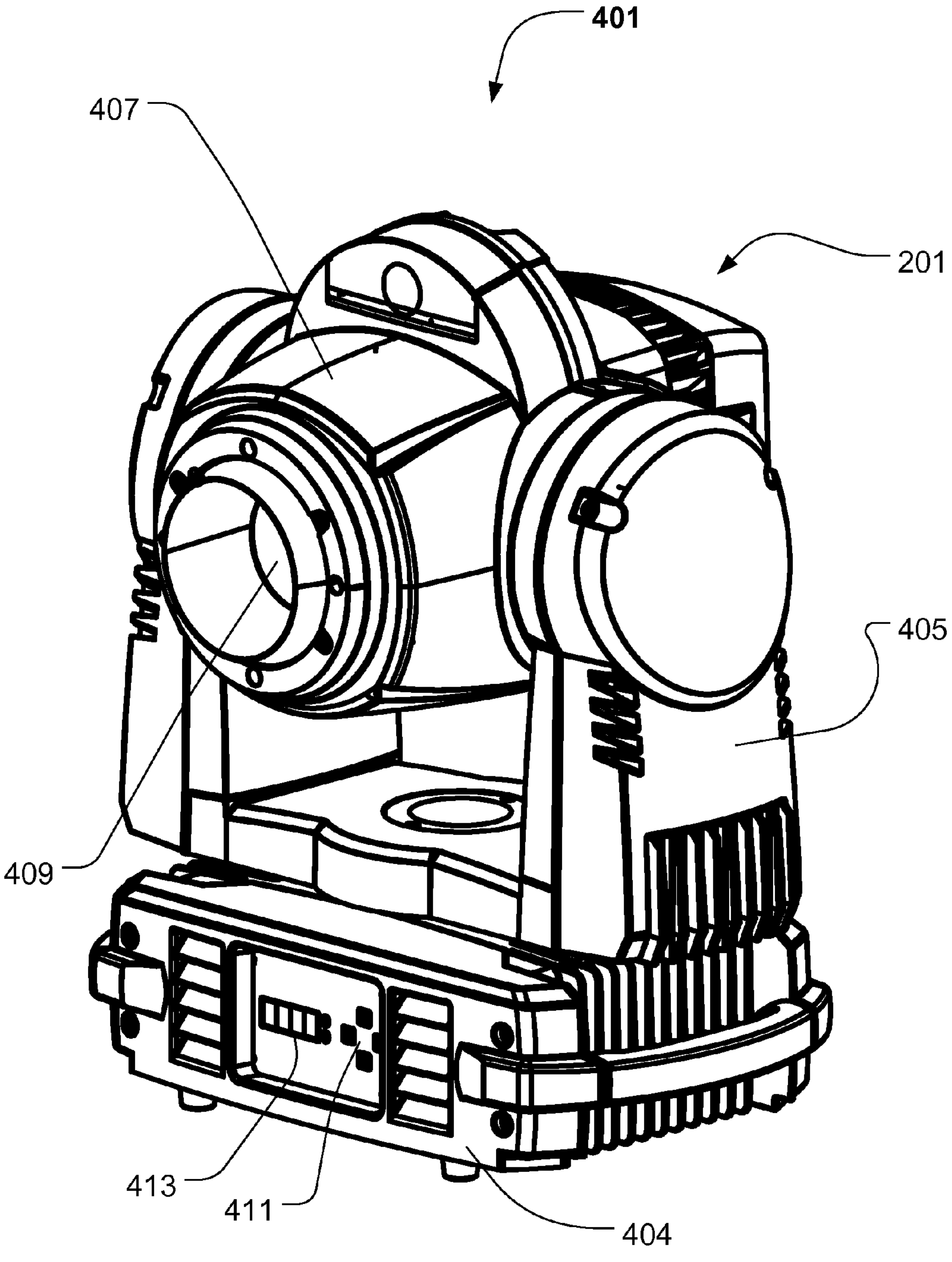
FIG. 4 illustrates a moving head light fixture having an illumination device according to the present invention.

FIG. 4 is a perspective view of moving head light fixture 401 where the GOBO projector of FIG. 2-3 has been integrated into the head. The moving head lighting fixture 401 comprising a base 403, a yoke 405 rotatable connected to the base and a head 407 rotatable connected to the yoke. The head comprises an illumination device according to the present invention and generates a light beam (not shown) exiting the head through an exit lens 409 of the projecting system (205 of FIG. 2). The moving head light fixture comprises first rotating means for rotating the yoke in relation to the base, for instance by rotating a shaft connected to the yoke by using a motor positioned in the base. The moving head light fixture comprises also second rotating means for rotating the head in relation to the yoke, for instance by rotating a shaft connected to the head by using a motor positioned in the yoke. The skilled person would realize that the rotation means could be constructed in many different ways using mechanical components such as motors, shafts, gears, cables, chains, transmission systems etc. The light source module 201 constitutes the back part of the head 407 and is described in detail in FIG. 5-FIG. 8.

The moving head light fixture receives electrical power from an external power supply. The electrical power is received by an internal power supply which adapts and distributes electrical power through internal power lines to the subsystems of the moving head. The internal power system can be constructed in many different ways. The light fixture comprises also a controller which controls the other components (other subsystems) in the light fixture based on an input signal indicative of at least one light effect parameter and at least one position parameter. The controller receives the input signal from a light controller (nor shown) as known in the art of intelligent and entertainment lighting for instance by using a standard protocol like DMX, ArtNET, RDM etc. The light effect parameter is indicative of at least one light effect parameter of said light beam for instance the amount of dimming and/or the dimming speed of the light beam, a color that a CMY system should mix, the kind of color filter that a color filter system should position in the light beam and/or the kind of gobo that the gobo system should position in the light beam, the divergence of the light beam that light fixture should create using a zoom system, a focus distance that indicate the distance form the lens to a surface where a gobo effect should be imaged, etc.

The controller is adapted to send commands and instructions to the different subsystems of the moving head through internal communication lines. The internal communication system can be based on a various type of communications networks/systems.

The moving head can also have user input means enabling a user to interact directly with the moving head instead of using a light controller to communicate with the moving head. The user input means 411 could for instance be bottoms, joysticks, touch pads, keyboard, mouse etc. The user input means could also be supported by a display 413 enabling the user to interact with the moving head through menu system shown on the display using the user input means. The display device and user input means could in one embodiment also be integrated as a touch screen.

The present invention can for instance be implemented into a projecting device comprising a digital imaging device such as a DML, DLP, LCD, LCOS or into the head of a moving head light fixture comprising a base, a rotatable yoke connected to the base and a rotatable head connected to the yoke. Hereby a power efficient digital projecting device or a moving head with uniform illumination of the imaging gate and without color artifacts is provided.

Figure 5:
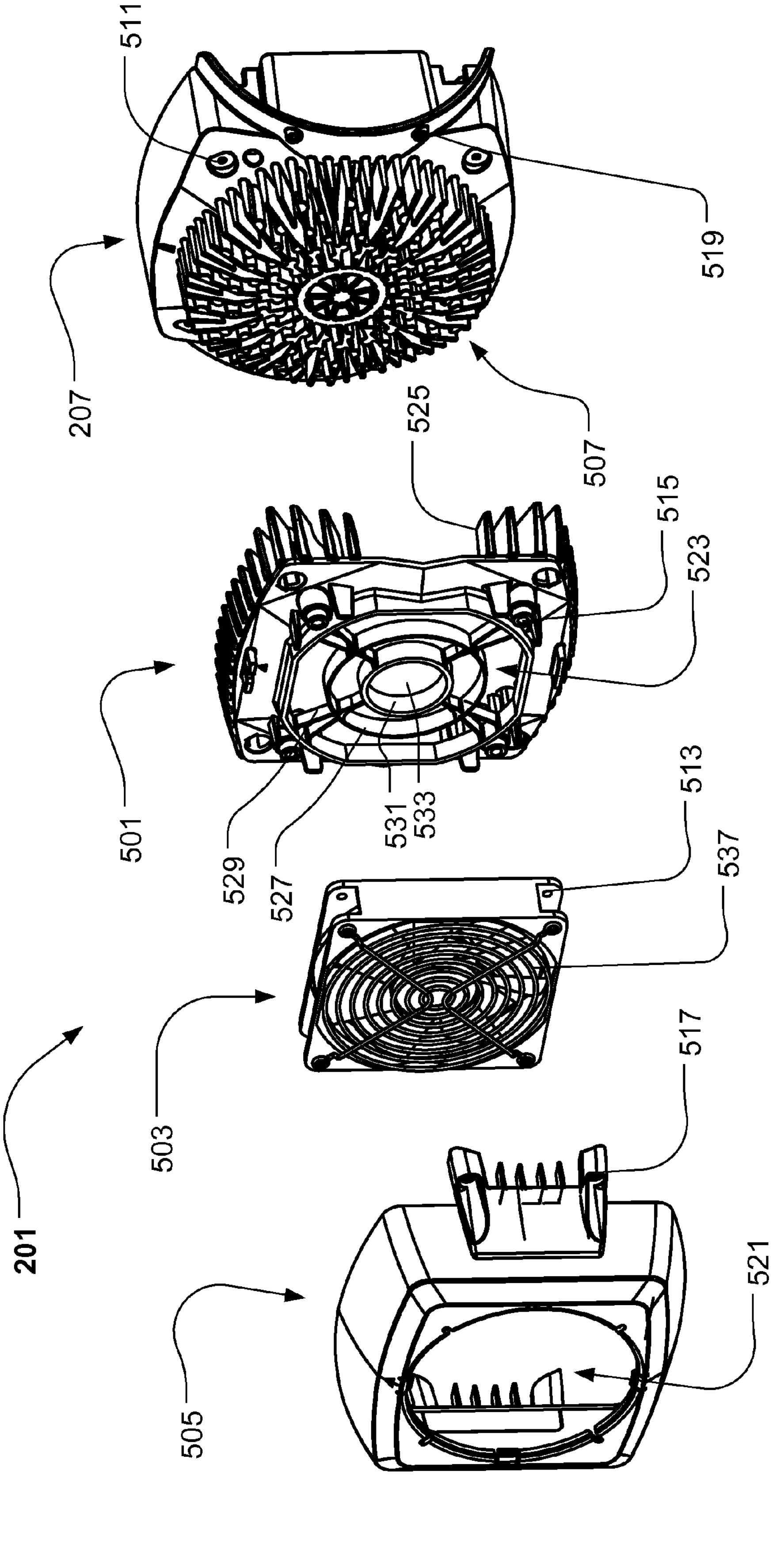
FIG. 5 illustrates an exploded back side view of a light source module of an illumination device according to the present invention.

FIG. 5 illustrates an exploded back side view of the light source module according to the present invention and used in the moving head light fixture in FIG. 4. The light source module comprises a cooling module 207, a fan holder 501, a fan 503 and a fan cover 505.

The front side of the cooling module is substantial identical to the cooling module shown in FIG. 3*b* and comprises a number of mounting surfaces where a number of LEDs are arranged as described above. The second side of the cooling module comprises a number of cooling fins 507 which is adapted to dissipate heat from the light sources mounted on the first side of the cooling module. The fan holder 503 fits down on the cooling fins and is secured to the cooling module using fasting means for instance screws (not shown) which fit into the holes 509 (only one indicated for simplicity) on the fan holder and threaded holes 511 (only one indicated for simplicity) in the cooling module. The fan 503 is arranged at the fan holder 501 and secured to the fan holder using screws which fit into holes 513 (only one of each indicated for simplicity) and threaded holes 515 (only one of each indicated for simplicity). The fan cover 505 is arranged onto the fan holder and secured to the cooling module using screws (not shown) which fit into holes 517 (only one of each indicated for simplicity) and threaded holes 519 (only one of each indicated for simplicity). The fan holder fit down on the cooling fins and the fan is adapted to blow air towards the cooling fins which results in a very compact light source module as the fan holder can fan can be integrated with the cooling module and adapted to appear as one compact unit.

The fan is adapted to pull air into the fan cover through entrance hole 521 and blow the air towards the cooling fins 507 through an exit hole 523 in the fan holder 501. The air is thus forces into a number of air passages defined by the cooling fins 507 and exits the cooling module at the side of the cooling fins. The fan holder comprises also a number of extension cooling fins 525 which surrounds the cooling fins 507 of the cooling module and is adapted to extend the cooling fins 507. The cooling fins 507 can be adapted to be in contact with cooling fins 507 and/or the second side cooling module (mounting surfaces) and heat can thus also be dissipated through these cooling fins 525. The cooling fins 525 extend the cooling fins and the air passages between the cooling fins is thus also extended whereby a more heat can be dissipated to through the air stream.

The fan holder comprises also an middle air guide 527 arrange in the middle part of the hole 523 using a number of ridge carrying bars 529. The middle air guide 527 ensures that a part of the air from the fan is let into the central part of the cooling fins 507. The fan holder comprises also a central air guide 531 which guides air to the cooling fins 507 and also ensures also that there not/turbulent flow below the central part 533 of the fan. The air is thus let more efficiently to the cooling fins 507. A protection grill 537 is arranged above the fan and prevents user from getting in contact with the fan 503.

The fan cover comprises also a number of extension cooling fins 537 which fits down on the fan holder and surrounds a part of the cooling fins 507 of the cooling module. These extension cooling fins extend the cooling fins 507 similar to the cooling fins 525 of the fan holder.

The fan cover 505 fits down on the fan holder and the fan holder fits down on the cooling module which makes it possible to provide a very compact light source module with good cooling effect.

The cooling module, fan holder and fan cover are designed such that they can be a manufactured using traditional molding technique which decreases the manufacturing costs.

Figure 6:
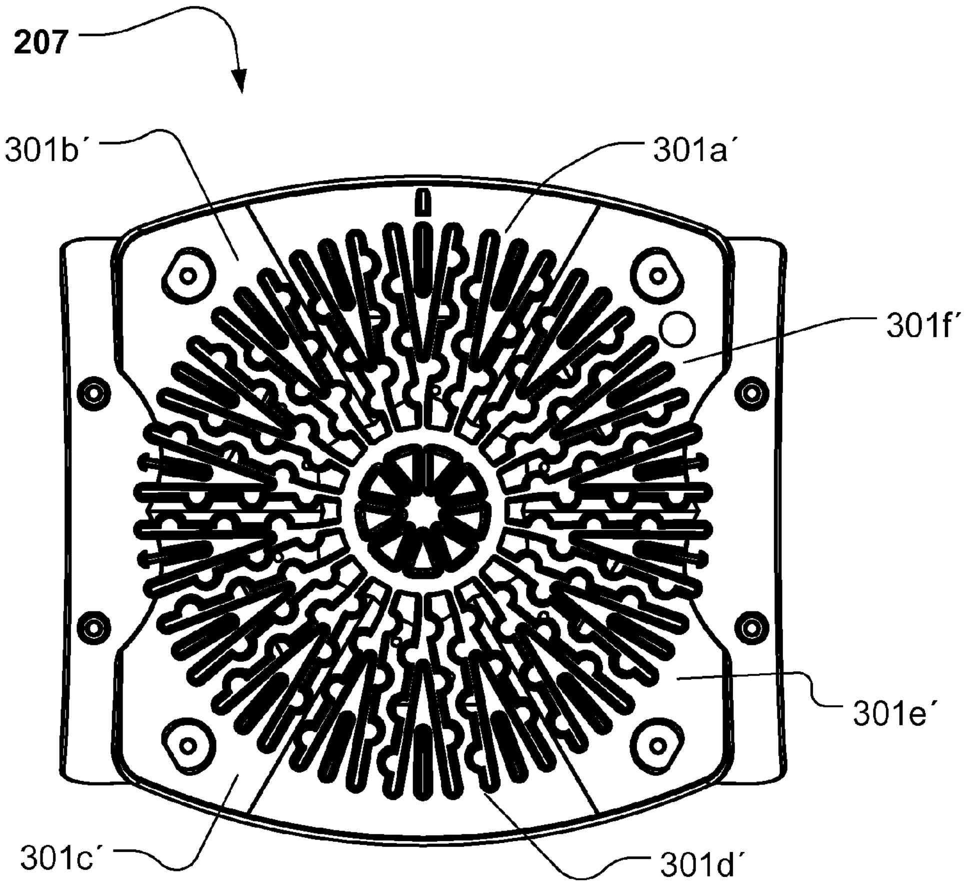
FIG. 6 illustrates a bottom view a cooling module of a illumination device according to the present invention.
Figure 7:
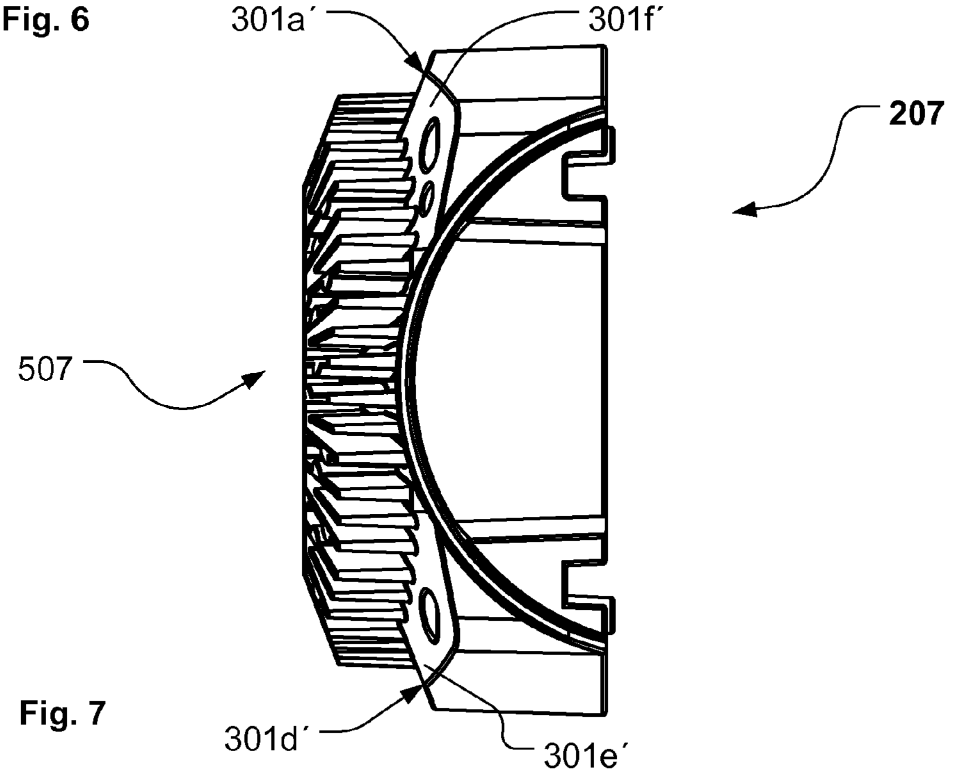
FIG. 7 illustrates a side view the cooling module illustrated in FIG. 6.

FIG. 6 illustrates a bottom view and FIG. 7 a side view the cooling module. The second side of the mounting surfaces is indicated as 301*a*'-301*f*' (the second side of the central mounting surface 301*g* is not indicated as it is positioned below the central part of the cooling fins 507. It can thus be seen that the second side of the cooling module is formed as a number of interconnected plane surfaces 301*a*'-301*f*' angled in relation to each other and that these plane surfaces are substantial parallel to their corresponding mounting surfaces. It can further be seen that the cooling fins extends from these interconnected plane surfaces 301*a*'-301*f*' and is positioned substantially along the slope of these interconnected plane surfaces 301*a*'-301*f*'.

Figure 8:
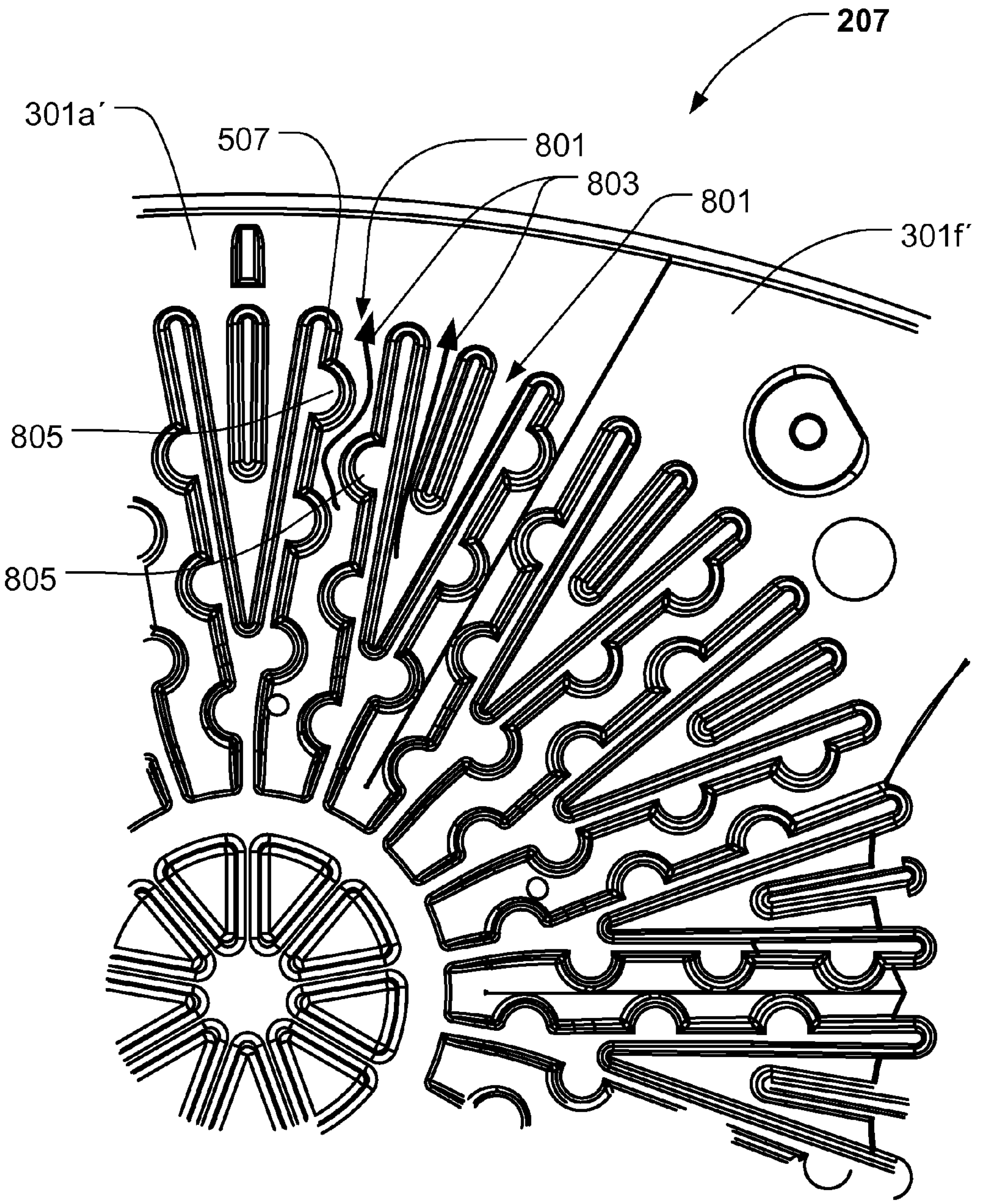
FIG. 8 illustrates an enlarge view of the top right corner of the cooling module in FIG. 6.

FIG. 8 illustrates an enlarge view of the top right corner of the cooling module in FIG. 6. The cooling fins 507 define a number of radial air channels 801 and air is forces into these air channels by the fan. The interconnected plane surfaces 301*a*'-301*f*' on the second side of the cooling module forms the bottom of the air channels. Air flows in a radial direction as indicated by arrows 803 and removes heat from the cooling fins. At least a part of the cooling fins comprises a number of protrusions 805 which creates a turbulent air flow through the air channel whereby the air is mixed through the air channel improving the heat exchange between the cooling fins and the air. The protrusions of neighboring cooling fins are displaced in relation to each other whereby a "snake" shaped air channel is created. This increases the turbulent flow and improves the heat exchange whereby more heat can be dissipated away by the air channel. The radial air channels 801 make it possible to cool the cooling module form the center and out. The cooling module is often hottest at the center and the fan provides the coolest air at the center where by the cooling effect is largest at the center. The result is that the temperature of the entire cooling module becomes more uniform, which is an advantage as the LED typically degrade as a function of temperature and the LED will thus degrade substantially identical. A further advantage of the radial air channels is the fact that a smaller fan can be used as air only needs to be blown into the central part of the cooling module. The result is that a very compact light source module can be provided module.

The invention is illustrated in view of an LED module comprising 7 LEDs and 7 mounting surfaces. However the skilled person realizes that the invention can be carried with any number of LEDs and mounting surfaces. The LED can be single LEDs with a single emitter generating single color light or multiple emitters LED with emitters generating difference colors for instance 3 in 1 RGS led, 4 in RGBW LEDs.

The invention claimed is:

1. An illumination device comprising:

a light source module comprising a number of light sources and a number of light collectors, said light collectors collect and convert light from at least one of said light sources into a source light beam, said source light beam propagates primarily along a primary optical axis;

a projecting system positioned along said primary optical axis, said projecting system has an entrance pupil collecting a part of said light generated by said light sources, said projecting system projects said collected light towards a target surface;

an aperture positioned between said light source module and said projecting system;

wherein said light source module comprises a cooling module comprising a number of interconnected plane mounting surfaces angled in relation to each other, said number of light sources are arranged on said plane mounting surfaces; and wherein said cooling module comprises a first side comprising said mounting surfaces and a second side comprising a number of cooling fins defining a number of radial air channels.

2. The illumination device according to claim 1, wherein said light sources are arranged on separate plane metal core electric circuit boards, said separate plane metal core electric circuit boards are arranged on different plane mounting surfaces.

3. The illumination device according to claim 1, wherein said plane mounting surface is perpendicular to said light source beam generated by said light source mounted on said plane mounting surface.

4. The illumination device according to claim 1, wherein said cooling fins comprise a number of protrusions protruding at least partially into said air channels.

5. The illumination device according to claim 1, wherein said light source module comprises a fan holder adapted to fit down on said cooling fins and adapted to hold a fan, said fan blows air towards said cooling fins.

6. The illumination device according to claim 1, wherein said fan holder comprises a number of extension cooling fins, said extension cooling fins surround and extend at least a part of said cooling fins of said cooling module.

7. The illumination device according to claim 5 wherein said fan holder comprises at least one air guide adapted to guide at least a part of the air from the said fan is into the central part of the radial air channels.

8. The illumination device according to claim 5, wherein said light source module comprises a fan cover adapted to fit down on said fan and said fan holder and covers at least at part of said fan.

9. The illumination device according to claim 8, wherein said fan cover comprises a number of extension cooling fins, said extension cooling fins surround and extend at least a part of said cooling fins of said cooling module.

10. The illumination device according to claim 1, wherein said illumination device is a projecting moving head light fixture comprising a base, a yoke rotatably connected to said base and a head rotatably connected to said yoke, said head comprising said light source module; said projecting system; said aperture and a light modifier adapted to modify said light beam; wherein said projecting system is adapted to image said light modifier at a target surface a distance along said primary optical axis.

11. The illumination device according to claim 1, wherein said illumination device is a digital projecting device comprising a digital imaging device, said digital imaging device adapted to modify said source light beam, and said projecting system is adapted to image said digital imaging device at a target surface a distance along said primary optical axis.

12. A light source module comprising a number of light sources and a number of light collectors, said light collectors collect and convert light from at least one of said light sources into a source light beam, said source light beam propagates primarily along a primary optical axis; said light source module comprises a cooling module comprising a number of interconnected plane mounting surfaces angled in relation to each other, said number of light sources are arranged on said plane mounting surfaces wherein said cooling module comprises a first side comprising said mounting surfaces and a second side comprising a number of cooling fins defining a number of radial air channels.

13. The light source module according to claim 12, wherein said light sources are arranged on separate plane metal core electric circuit boards, said separate plane metal core electric circuit boards are arranged on different plane mounting surfaces.

14. The light source module according to claim 12, wherein said plane mounting surface is perpendicular to said light source beam generated by said light source mounted on said plane mounting surface.

15. The light source module according to claim 12, wherein said cooling fins comprise a number of protrusions protruding at least partially into said air channels.

* * * * *